United States Patent
Takahama

[15] 3,641,893
[45] Feb. 15, 1972

[54] CAMERA CARTRIDGE RELEASE MECHANISM

[72] Inventor: Sho Takahama, Takarazukashi, Japan
[73] Assignee: Minolta Camera Co., Ltd., Osaka, Japan
[22] Filed: Mar. 5, 1970
[21] Appl. No.: 22,106

[30] Foreign Application Priority Data
 Mar. 14, 1969 Japan..................................44/22756

[52] U.S. Cl ................................95/11 W, 95/12.5, 95/19, 352/242
[51] Int. Cl.........................................................E01c 5/00
[58] Field of Search...........................95/11, 11 W, 12.5, 19; 352/242

[56] References Cited
UNITED STATES PATENTS
2,487,868  11/1949  Grigsby................................95/11 W

*Primary Examiner*—Samuel S. Matthews
*Assistant Examiner*—Richard A. Wintercorn
*Attorney*—Stanley Wolder

[57] ABSTRACT

An underwater camera comprises a watertight housing including a separable cover and a camera body mounted therein including a winding member vertically movable into and out of engagement with the spool of a replaceable film cartridge. A vertical slide member engages the winding member and a spring biased lever raises the slide and winding members and includes a sensing arm engaging the housing cover which, upon closing of the cover, swings the lever to lower the slide and winding members and upon opening the cover the lever is spring rocked to raise the slide and winding members and release the film cartridge.

6 Claims, 4 Drawing Figures

PATENTED FEB 15 1972

3,641,893

INVENTOR
SHO TAKAHAMA

BY Stanley Wolder
ATTORNEY

CAMERA CARTRIDGE RELEASE MECHANISM

BACKGROUND OF THE INVENTION

The present invention relates generally to improvements in cameras and it relates particularly to an improved underwater camera provided with an automatic film cartridge release mechanism.

In the conventional camera the film cartridge or magazine is locked in the camera by a winding member which is in driving engagement with the cartridge spool. In order to permit the removal or insertion of a film cartridge it is necessary to raise the winding member out of engagement with the cartridge. Generally, a locking mechanism is associated with the cover affording access to the camera film cartridge chamber, and upon the opening of the lock to permit the opening of the camera cover, the camera winding member is concurrently retracted from engagement with the film cartridge and the cartridge chamber, thereby to facilitate the replacement of the cartridge. The provision in a waterproof camera of an externally operated mechanism of the above type is accompanied by great difficulties in achieving a watertight condition, and the known mechanisms for obviating these difficulties are highly complicated, expensive and unreliable and otherwise leave much to be desired.

SUMMARY OF THE INVENTION

It is a principal object of the present invention to provide an improved camera structure.

Another object of the present invention is to provide an improved underwater camera.

Still another object of the present invention is to provide in an underwater camera an improved mechanism for facilitating the insertion, removal and replacement of the film magazine or cartridge.

A further object of the present invention is to provide an improved underwater camera mechanism of the above nature characterized by its simplicity, reliability, ruggedness, low cost and ease of operation.

The above and other objects of the present invention will become apparent from a reading of the following description taken in conjunction with the accompanying drawings which illustrate a preferred embodiment thereof.

In a sense the present invention contemplates the provision in an underwater camera comprising a watertight housing including a cover member movable between a closed position and an open position, and a body member within the housing adapted to releasably hold a film cartridge and including a cartridge engaging member movable between advanced and retracted positions respectively engaging and disengaging the film cartridge, the improvement comprising shifting means responsive to the movement of said cover member between said closed and open positions for respectively retracting and advancing said cartridge engaging member.

In its preferred form the housing includes a front main section and a removable door defining second section. The cartridge engaging member comprises a winding member which is vertically movable into and out of driving engagement with the film cartridge spool and includes an upper peripheral flange. A vertical slide member carries an annulus which engages the winder member and underlies the flange, and includes an outwardly projecting arm. The shifting means comprises a lever rockable about a horizontal axis and engaging the underface of the slide member arm and an angularly spaced sensing arm mounted for rotation with the lever and directed into engagement with the housing cover. A first soft spring urges the winding member downwardly, a heavier second spring biases the lever in a direction to raise the slide member and winding member and urge the sensing arm toward the housing cover, and a tension spring connects the slide member arm and the lever.

The improved mechanism requires no external connection and operates to engage and disengage the film cartridge merely by closing and opening the cover. With the closing of the cover, the cover bears on the sensing arm to swing the lever in a direction to lower the slide member and permit the spring advance of the winding member into engagement with the film cartridge and upon opening of the cover the sensing arm is released so that the lever is swung by the spring to raise the slide member and winding member and release the film cartridge for replacement.

DESCRIPTION OF THE PREFERRED EMBODIMENT

Figure 1:
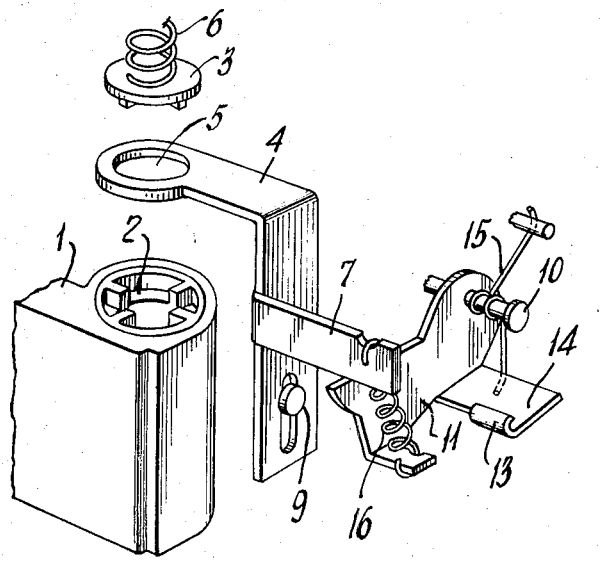
FIG. 1 is a partially exploded, perspective, fragmentary view of a mechanism embodying the present invention.

Referring now to the drawings which illustrate a preferred embodiment of the present invention the reference numeral 8 generally designates the body of a camera of basically conventional construction and provided with a rearwardly accessible cavity or chamber for the reception of a replaceable film magazine or cartridge 1. The film cartridge 1 is of known construction and is provided proximate an end thereof with a film spool having an upper end face with circumferentially spaced coaxial arcuate grooves 2 formed therein separated by radial projections.

The camera body 8 is suitably mounted to the front or main section 17 of a waterproof housing to which is suitably separably secured in water tight engagement a rear housing cover section 12. The housing sections 12 and 17 have confronting chamber defining cavities and are releasably held in separable watertight engagement by suitable gasketing and any well known releasable locking mechanism (not shown).

Associated with the camera body 8 is a winding member 3 including a circular upper section provided on its underface with depending integrally formed radial spokes extending to points short of the periphery of the circular upper section to leave a free peripheral flange, the spokes being adapted to engage and nest in corresponding spool grooves 2. The winding member 3 is vertically movable between an advanced lowered position in intermeshing engagement with spool grooves 2 and a retracted raised position out of the cartridge receiving chamber and out of engagement with the cartridge 1 and grooves 2 and is normally urged to its advanced engage position by a soft helical compression spring 6 bearing on the top of winding member 3.

An inverted L-shaped slide member includes a vertical leg having a vertical slot therein slideably engaged by a pin 9 affixed to a side face of camera body 8 and an upper horizontal leg terminating in an annular section underlying the peripheral flange of winding member 3 and having an opening 5 therein through which the winding member spokes depend. Projecting laterally from the vertical leg of slide member 4 is a horizontal arm 7. Vertical upward movement of arm 7 effects the corresponding upward vertical movement of slide member 4 and winding member 3, and the lowering of arm 7 effects the lowering of slide member 4 which permits the spring lowering of winding member 3.

A shift lever defining plate 11 is pivotally supported at its upper forward corner by a horizontal pin 14 disposed rearwardly of arm 7 and projecting laterally from camera body 8. Shift lever 11 is directed rearwardly and rockable about pin 14 and includes an upper shoulder bearing on the underface of arm 7. An arm 14 is integrally formed with lever plate 11 and projects outwardly laterally from the lower rear corner thereof, a point angularly spaced about pin 10 from the shoulder section of lever 11 engaging arm 7. A curved sensor and activating finger 13 is directed rearwardly from the free end of arm 14 into bearing engagement with housing cover 12 when the cover is in closed position.

A hairpin spring 15 encircles pin 10 and includes one arm bearing on the front edge of arm 14 and an opposite arm engaged by an upper forward abutment pin to resiliently urge lever plate 11 in a clockwise direction as viewed in FIG. 1 whereby to normally urge slide member 4 and winding member 3 upwardly. A helical tension spring 16 is connected between arm 7 and a tab projecting from the lower rear corner of lever plate 11 below and forwardly of arm 7 whereby to cause the resilient lowering of arm 7 with the counterclockwise swinging of shift lever 11. It should be noted that when housing cover 12 is in closed position, it bears on sensing finger 13 to swing shift lever 11 counterclockwise to its advanced position against the influence of spring 15 to lower slide member by way of spring 16.

Figure 4:
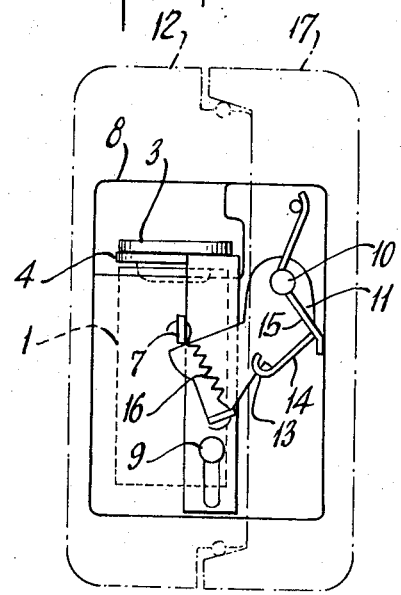
FIG. 4 is a view similar to FIG. 3 with the housing cover in a closed condition.

Considering now the operation of the mechanism described above, when the housing is in its closed condition, as shown in FIG. 4, cover 12 bearing on finger 13 retains shifting lever 11 in its depressed position keeping slide member 4, as explained above, so as to release winding member 3 which is urged by spring 6 into engagement with grooves 2 of the cartridge spool.

Figure 3:
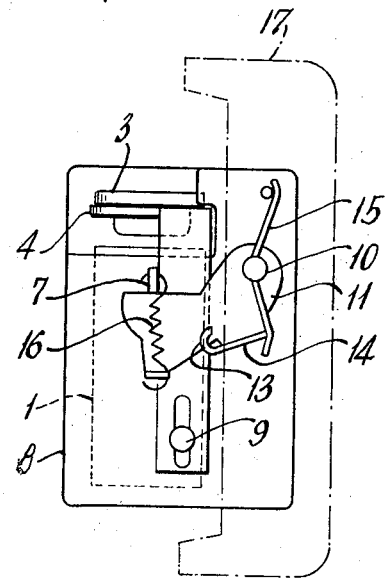
FIG. 3 is a side elevational view thereof with the housing cover removed.
Figure 2:
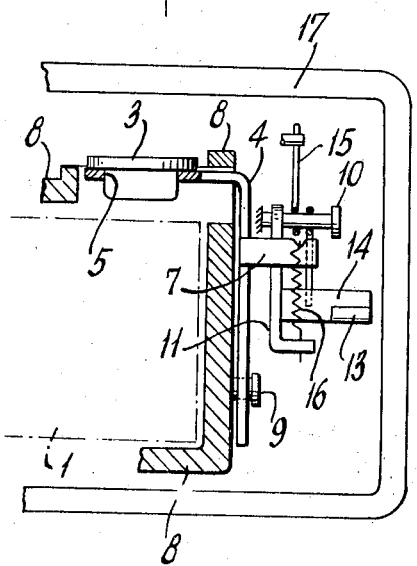
FIG. 2 is a rear, fragmentary, assembled view thereof, partially in section and shown in a cartridge released position.

When the housing is opened by separating the cover 12 from section 17, sensing finger 13 is released and shift lever 11 is swung clockwise by spring 15 to the position shown in FIG. 3. The clockwise swing of shift lever 11 raises slide member 4 by bearing on and raising arm 7, the rising slide member 4 in turn lifting winding member 3 to its retracted position against the lesser influence of spring 6. The winding member 3 is thus disengaged from and releases cartridge 1 which may be removed and replaced. Thereafter, the housing is closed by cover 12 which bears on finger 13, to swing lever 11 clockwise and thereby lower slide member 4 which permits the winding member 3 to be urged by spring 6 into engagement with the spool grooves 2.

While there has been described and illustrated a preferred embodiment of the present invention, it is apparent that numerous alterations, omissions and additions may be made without departing from the spirit thereof.

I claim:

1. An underwater camera comprising a watertight housing including a cover member movable between a closed position and an open position, a body member positioned within said housing and adapted to releasably hold a film cartridge having a spool, a winding member movable between advanced and retracted positions respectively engaging and disengaging said spool, and shifting means comprising a shifting member including a sensing element engaging said cover member and movable between a retracted and advanced position with the respective opening and closing of said cover member, and means coupling said shifting member to said winding member to advance and retract said winding member with the advance and retraction of said shifting member.

2. The underwater camera of claim 1 including spring means urging said shifting member toward its retracted position.

3. The underwater camera of claim 1 wherein said winding member includes a peripheral flange, said shifting member comprises a lever pivotally mounted for rocking about a horizontal axis and said coupling means comprises a slide member supported for vertical movement and including a shoulder lying above and in the path of movement of said lever, and a coupling section engaging the underface of said winding member flange.

4. The underwater camera of claim 3 including a spring means urging said winding member downwardly and a tension spring extending downwardly from said slide member to said lever.

5. The underwater camera of claim 1, wherein said winding member includes an upper peripheral flange, said coupling means comprises a vertical slide member including a first laterally projecting upper arm terminating in an annulus engaging said winding member and underlying said flange and a second laterally projecting arm, and said shifting member comprises a lever mounted for rocking about a horizontal axis and engaging the underface of said second arm and said sensing element includes an arm mounted on and angularly offset about said axis relative to said lever and projecting toward said cover, and spring means urging said lever upwardly to raise said slide member and urge said sensing element toward said cover.

6. The underwater camera of claim 5 including a tension spring connected between said second arm and said lever.

* * * * *